(12) United States Patent
Roeder et al.

(10) Patent No.: US 7,497,500 B2
(45) Date of Patent: Mar. 3, 2009

(54) COVER ASSEMBLY FOR STOWAGE COMPARTMENT OF MOVABLE MOTOR VEHICLE ROOF

(75) Inventors: Holger Roeder, Eislingen (DE); Michael Neuberger, Öhringen (DE)

(73) Assignee: Magna Car Top Systems GmbH, Bietigheim-Bissingen (DE)

( * ) Notice: Subject to any disclaimer, the term of this patent is extended or adjusted under 35 U.S.C. 154(b) by 202 days.

(21) Appl. No.: 11/565,808

(22) Filed: Dec. 1, 2006

(65) Prior Publication Data

US 2008/0007084 A1 Jan. 10, 2008

(30) Foreign Application Priority Data

Dec. 1, 2005 (DE) .................. 10 2005 057 651

(51) Int. Cl.
*B60J 7/20* (2006.01)
(52) U.S. Cl. .................. 296/136.05; 296/107.08
(58) Field of Classification Search ............ 296/107.08, 296/136.05, 24.44, 37.16, 136.03
See application file for complete search history.

(56) References Cited

U.S. PATENT DOCUMENTS

| | | | | |
|---|---|---|---|---|
| 4,687,247 A * | 8/1987 | Muscat | .................. | 296/136.06 |
| 4,799,729 A * | 1/1989 | Muscat | .................. | 296/136.06 |
| 5,921,608 A * | 7/1999 | Schmitt et al. | ......... | 296/107.08 |
| 5,967,593 A * | 10/1999 | Schuler et al. | ......... | 296/136.06 |
| 6,318,792 B1 * | 11/2001 | Neubrand et al. | ...... | 296/107.08 |
| 6,454,343 B1 | 9/2002 | Wagner et al. | | |
| 6,604,774 B2 * | 8/2003 | Koch et al. | ............. | 296/107.08 |
| 6,616,213 B2 * | 9/2003 | Koch | ..................... | 296/107.08 |
| 6,619,721 B1 * | 9/2003 | Langguth et al. | ....... | 296/136.06 |
| 6,644,715 B1 * | 11/2003 | Bohnke | ................. | 296/107.08 |
| 6,652,017 B2 * | 11/2003 | Wagner et al. | ......... | 296/107.08 |
| 6,663,163 B2 * | 12/2003 | Koch | ..................... | 296/107.08 |
| 6,672,645 B2 * | 1/2004 | Quindt | .................. | 296/107.08 |
| 6,682,149 B1 * | 1/2004 | Guillez et al. | ............... | 296/108 |
| 6,736,443 B2 * | 5/2004 | Holst et al. | ............ | 296/107.08 |
| 6,814,390 B2 * | 11/2004 | Habacker | ............... | 296/107.08 |
| 7,032,947 B2 * | 4/2006 | Queveau et al. | .......... | 296/24.44 |
| 7,185,942 B2 * | 3/2007 | Roeder et al. | .......... | 296/136.06 |
| 7,252,323 B2 * | 8/2007 | Cole et al. | ............. | 296/107.08 |

(Continued)

FOREIGN PATENT DOCUMENTS

DE 197 12 967 A1 10/1998

(Continued)

*Primary Examiner*—Glenn Dayoan
*Assistant Examiner*—Paul A Chenevert
(74) *Attorney, Agent, or Firm*—Brooks Kushman P.C.

(57) ABSTRACT

A cover assembly for the stowage compartment of a vehicle roof movable between a covered position in which the roof covers the vehicle interior and a stowage position in which the roof is lowered into the stowage compartment. A swivel arm connects middle and cover sections such that the cover section is movable upon movement of the swivel arm relative to the middle section between the covered position in which the cover section is disposed to a side of the middle section and the stowage position in which the cover section is disposed beneath the middle section. In the covered position the cover section is supportable on the body of the vehicle. A floating bearing supports the cover section on the end of the swivel arm connected to the cover section such that the cover section is adjustable along X, Y, and Z axes relative to the swivel arm.

15 Claims, 3 Drawing Sheets

U.S. PATENT DOCUMENTS

| | | | |
|---|---|---|---|
| 7,316,438 B2* | 1/2008 | Queveau et al. | 296/24.43 |
| 7,322,635 B2* | 1/2008 | Kuttner et al. | 296/107.08 |
| 7,347,482 B2* | 3/2008 | Powell | 296/107.08 |
| 7,367,607 B2* | 5/2008 | Roeder et al. | 296/107.08 |
| 7,419,200 B2* | 9/2008 | Queveau et al. | 296/24.44 |
| 2002/0041109 A1 | 4/2002 | Wagner et al. | |
| 2003/0209920 A1* | 11/2003 | Fuchs et al. | 296/107.08 |
| 2005/0248171 A1* | 11/2005 | Guillez et al. | 296/24.44 |
| 2007/0035146 A1* | 2/2007 | Baumeier | 296/24.44 |
| 2007/0182200 A1* | 8/2007 | Baumeier et al. | 296/107.08 |
| 2008/0129076 A1* | 6/2008 | Araki et al. | 296/107.08 |

FOREIGN PATENT DOCUMENTS

| | | |
|---|---|---|
| DE | 298 12 165 U1 | 5/1999 |
| DE | 102 20 770 C1 | 11/2003 |
| EP | 1 038 710 A1 | 9/2000 |
| EP | 1 197 368 A2 | 4/2002 |
| WO | WO 2005/049354 A1 | 6/2005 |

* cited by examiner

COVER ASSEMBLY FOR STOWAGE COMPARTMENT OF MOVABLE MOTOR VEHICLE ROOF

CROSS-REFERENCE TO RELATED APPLICATIONS

This application claims foreign priority benefits under 35 U.S.C. § 119(a)-(d) to DE 10 2005 057 651.6, filed Dec. 1, 2005, which is hereby incorporated by reference in its entirety.

BACKGROUND OF THE INVENTION

1. Field of the Invention

The present invention relates to a cover assembly for the stowage compartment of a movable motor vehicle roof.

2. Background Art

DE 197 12 967 A1 describes a cover assembly for the stowage compartment of a movable motor vehicle roof. The roof is movable between a covered position in which the roof covers the vehicle interior and a stowed position in which the roof is lowered into the stowage compartment. The cover assembly includes a middle section and two cover sections. Rotary slide joints directly attach the cover sections to the middle section. The rotary slide joints enable the cover sections to swivel between the covered position in which the cover sections are laterally adjacent to the middle section, and the stowed position in which the cover sections are positioned beneath the middle section. The cover sections perform a precisely defined motion during the adjustment motion between the covered and stowed positions. Considerable factory-side adjustment effort is required for the cover sections and/or the rotary slide joints so that the cover sections precisely swivel while observing all tolerances.

EP 1 197 368 B1 (corresponding to U.S. Pat. No. 6,454, 343) describes a cover assembly for the stowage compartment of a movable motor vehicle roof. The roof is movable between a covered position in which the roof covers the vehicle interior and a stowed position in which the roof is lowered into the stowage compartment. The cover assembly includes a middle section and two cover sections. Respective swivel arms articulately connect the cover sections to the middle section. The swivel arms enable the cover sections to swivel between the covered position in which the cover sections are situated at the sides of the middle section, and the stowed position in which the cover sections are positioned beneath the middle section. The cover sections swivel upward relative to their swivel arms to overcome the vertical offset between the stowed and covered positions. Installation of the covers on their swivel arms involves considerable adjustment effort to allow the stowage compartment to provide precise coverage flush with the adjacent vehicle body parts with consideration for all manufacturing tolerances.

SUMMARY OF THE INVENTION

An object of the present invention is a cover assembly for the stowage compartment of a movable motor vehicle roof in which the cover assembly ensures precise coverage of the stowage compartment with minimal adjustment effort.

In carrying out the above object and other objects, the present invention provides a cover assembly for the stowage compartment of a roof of a vehicle. The roof is movable between a covered position in which the roof covers the interior of the vehicle and a stowage position in which the roof is lowered into the stowage compartment thereby exposing the vehicle interior. The cover assembly includes a middle section and a cover section. A swivel arm is connected at one end to the middle section and is connected at the other end to the cover section such that the cover section is movable upon movement of the swivel arm relative to the middle section between the covered position in which the cover section is laterally disposed to a side of the middle section and the stowage position in which the cover section is disposed beneath the middle section. In the covered position the cover section is supportable on the body of the vehicle. A floating bearing supports the cover section on the end of the swivel arm connected to the cover section such that the cover section is adjustable along X, Y, and Z axes relative to the swivel arm.

Further, in carrying out the above object and other objects, the present invention provides a cover assembly for the stowage compartment of a roof of a vehicle. The roof is movable between a covered position in which the roof covers the interior of the vehicle and a stowage position in which the roof is lowered into the stowage compartment thereby exposing the vehicle interior. The cover assembly includes a middle section and first and second cover sections. A first swivel arm is connected at one end to the middle section and is connected at the other end to the first cover section such that the first cover section is movable upon movement of the first swivel arm relative to the middle section between the covered position in which the first cover section is laterally disposed to one side of the middle section and the stowage position in which the first cover section is disposed beneath the middle section. In the covered position the first cover section is supportable on a first part of the body of the vehicle. A first floating bearing supports the first cover section on the end of the first swivel arm connected to the first cover section such that the first cover section is adjustable along X, Y, and Z axes relative to the first swivel arm. A second swivel arm is connected at one end to the middle section and is connected at the other end to the second cover section such that the second cover section is movable upon movement of the second swivel arm relative to the middle section between the covered position in which the second cover section is laterally disposed to an opposite side of the middle section and the stowage position in which the second cover section is disposed beneath the middle section. In the covered position the second cover section is supportable on a second part of the body of the vehicle. A second floating bearing supports the second cover section on the end of the second swivel arm connected to the second cover section such that the second cover section is adjustable along X, Y, and Z axes relative to the second swivel arm.

In an embodiment of the present invention, a floating bearing is provided for each cover section on its associated swivel arm so that the cover section is freely adjustable along all three X, Y, and Z coordinate axes relative to the swivel arm. When the cover section contacts a vehicle part such as a part of the vehicle body during the adjustment motion between the stowage and covered positions of the cover section, the cover section is displaced into its precise covered position upon further adjustment on account of the free movability along the three coordinate axes relative to the swivel arm. As a result of the relative displaceability of the cover section, compensation may be made for manufacturing tolerances. For example, compensation may be made for tolerances for the vehicle body and tolerances in the installation of the swivel arm or the cover section. It is advantageous for the floating bearing to be designed such that it is possible to adjust the cover section by approximately 5 mm in all directions as seen from a central point. In this manner, compensation may be made for tolerances up to approximately +/5 mm.

The cover sections are used to cover components normally situated in the vehicle interior which become exposed in the opened (stowage) position of the roof. In particular for vehicles having lowerable C-pillars, the cover sections may cover the space exposed by these C-pillars in the lowered position when the roof is lowered into the opened position.

The X-axis and the Y-axis lie in an imaginary plane defined by the cover section. For a cover section having a curved design, the plane lies in the average planar surface of the cover section. The plane is essentially horizontally aligned so that as an approximation it may be assumed that when the cover section is in the covered position the X-axis runs parallel to the longitudinal axis of the vehicle and the Y-axis runs parallel to the transverse axis of the vehicle. The Z-axis is perpendicular to the imaginary plane. That is, in the normal case the Z-axis is essentially vertical and parallel to the vertical axis of the vehicle. The floating bearing is designed such that the cover section is not consecutively adjustable along the X, Y, and Z axes. Rather, the floating bearing is designed such that the cover section is freely adjustable in space, i.e., simultaneously adjustable along the X, Y, and Z axes relative to the swivel arm.

In an embodiment of the present invention, at least one centering means is provided on the vehicle part which is traversed by the cover section during its adjustment motion between the covered and stowed positions. Alternatively, the at least one centering means is provided on the cover section itself. Each centering means has at least one stop bevel. In an embodiment, the at least one centering means includes three centering means. By use of the centering means having stop bevels it is possible to perform fine adjustment of the cover section relative to the swivel arm. The centering means provide for the precise positioning of the cover section. In an embodiment, the centering means are configured in a circumferential angle of at least approximately 120° with respect to one another. The centering means having stop bevels are primarily used to adjust the cover section in the imaginary plane defined by the cover section or the average planar surface of the cover section. The cover section is also adjusted perpendicular to this plane by the stop bevels. Stops for adjusting the cover section may be provided perpendicular to the imaginary plane in the positive Z-direction on the underside of the cover section.

In an embodiment of the present invention, the adjustment of the cover section relative to the swivel arm is performed in at least one direction against the force of a spring. In this manner, it is possible to pretension the cover section in its covered position. When the cover section is essentially moved from a vertical direction to its covered position, the adjustment of the cover section is performed in the positive Z-direction away from the swivel arm and against an elastic force. The cover section is thus impinged on by force from the spring in the direction of the swivel arm and thus toward the vehicle body. In this manner, the cover section is securely held in the covered position. At the same time, via the stop bevels the spring causes the cover section to be displaced in the imaginary plane defined by the cover section.

In an embodiment of the present invention, the floating bearing of the cover section on the swivel arm is implemented with at least one bolt on the cover section. The bolt is guided with axial displacement and with radial play through a receiving opening in the swivel arm. In this case, the cover section is permanently mounted on the swivel arm. In such a design of the floating bearing, the Z-axis runs parallel to the longitudinal axis of the bolt and the X and Y axes run radially. As a result of the play of the bolt within the receiving opening along the three coordinate axes, the cover section is freely and adjustably supported relative to the swivel arm.

A securing device is provided to prevent the bolt from sliding out of the receiving opening at the end of the bolt facing away from the cover section. The securing device is in the form of a bolt head having a diameter larger than the receiving opening. A spring such as a coil spring is between bolt head and the side of the swivel arm facing away from the cover section. The spring performs the motion of the cover section in the positive Z-axis direction away from the swivel arm by the impingement of elastic force. The spring is supported at one end on the bolt head and at the other end on the swivel arm. The bolt head is thus pushed away from the swivel arm in the negative Z-axis direction so that the cover section in turn is impinged on by elastic force in the direction of the swivel arm. The elastic force is to be overcome in order to then move the cover section away from the swivel arm in the positive Z-axis direction. As before, the cover section is securely held in its covered position by the elastic force. In addition, the cover section is adjusted in the imaginary plane defined by the cover section by the elastic force acting in the Z-axis direction together with at least one centering means having a stop bevel.

In an embodiment of the present invention, the cover assembly includes a middle section and two cover sections. The middle section extends essentially in the transverse direction of the vehicle. The middle section is generally used as a storage shelf. In the covered position, the cover sections are situated on the sides of the middle section flush thereto.

In an embodiment of the present invention, the cover sections are situated beneath the middle section in the stowed position. The swiveling of the cover sections into the stowed position takes place by the swivel arms.

In an embodiment of the present invention, the swivel arms are pivotably supported on the middle section. This allows the adjusting arms having the cover sections connected thereto in a floating manner together with the middle section to swivel. The middle section itself is pivotably supported to provide sufficient space for the adjusting motion of the roof between the covered and stowed positions. The middle section is pivotably supported about a swivel axis extending in the transverse direction of the vehicle. A multi-bar kinematic linkage cooperates with the middle section to swivel the middle section. In an embodiment, the kinematic linkage is a four-bar kinematic linkage. The middle section may thus be swivelled from an essentially horizontal covered position to an essentially vertical (or inclined) intermediate position. When the cover sections with their swivel arms in this intermediate position are moved from their stowed position to a lateral position with respect to the middle section, the cover sections themselves are moved back to their covered position from above as a result of the middle section swivelling back to its horizontal position. The cover sections contact the vehicle components thereby automatically centering the cover sections.

In an embodiment of the present invention, an electric motor having gearing is associated with each swivel arm. With assistance from the motor, the swivel arm and thus the cover section swivel between the covered and stowed positions. The motor drives a gearing worm which is tightly meshed with the worm gear connected to the swivel arm. Twisting of the gearing worm causes the swivel arm to rotate about the axis of the worm gear.

The above features, and other features and advantages of the present invention as readily apparent from the following detailed descriptions thereof when taken in connection with the accompanying drawings.

DETAILED DESCRIPTION OF THE PREFERRED EMBODIMENT(S)

In the figures, elements that are the same and elements having the same function are labeled with the same reference numbers.

Figure 1:
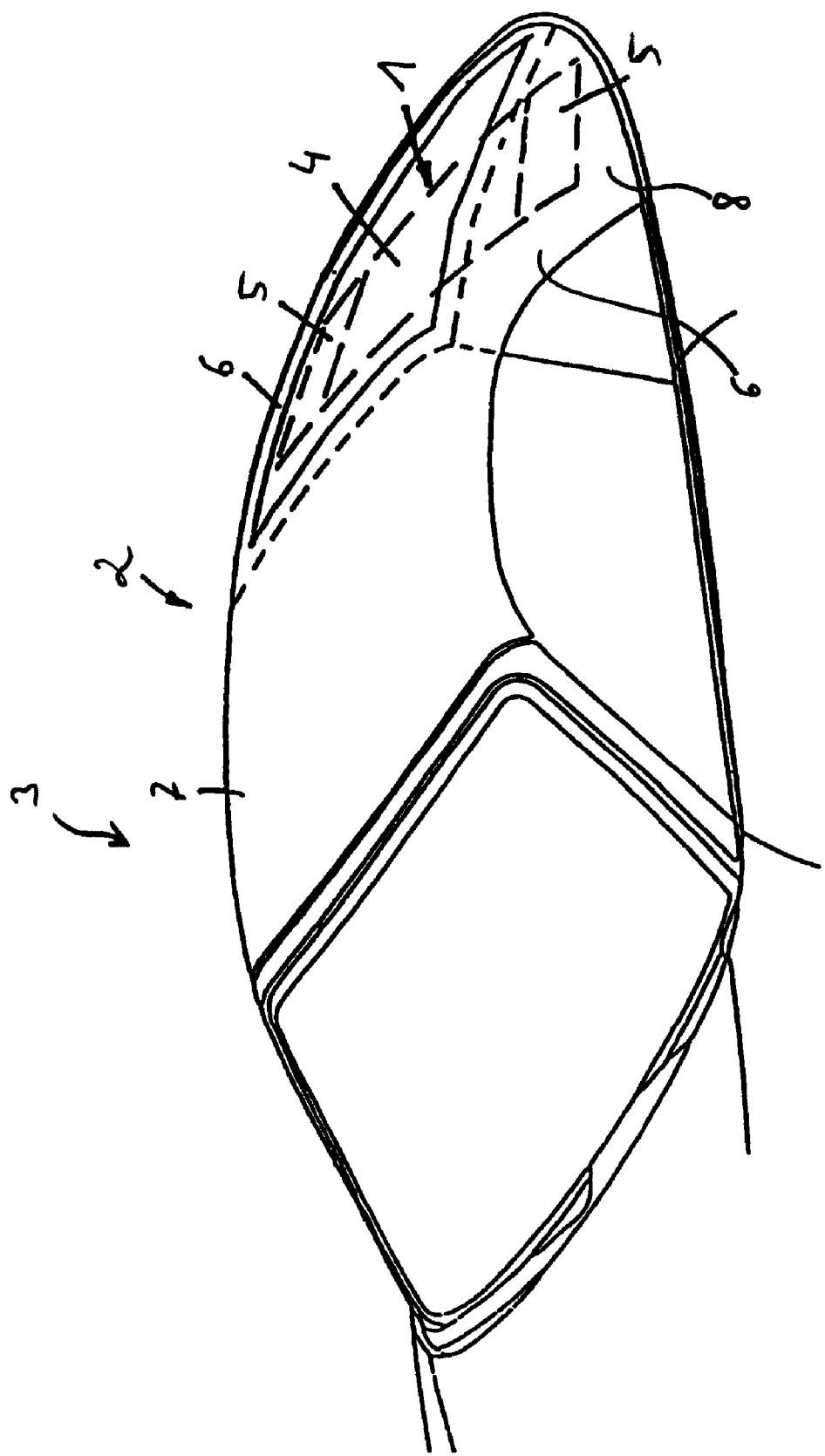
FIG. 1 illustrates a perspective view of a cover assembly for the stowage compartment of a movable motor vehicle roof in accordance with an embodiment of the present invention.

Referring now to FIG. 1, a perspective view of a cover assembly 1 for the stowage compartment of a movable roof 2 of a motor vehicle 3 in accordance with an embodiment of the present invention is shown. Roof 2 may either be a hardtop or soft-top roof. Roof 2 is movable between a covered position in which the roof covers the interior of vehicle 3 and a stowed position in which the roof is lowered into the stowage compartment thereby exposing the vehicle interior. FIG. 1 illustrates roof 2 in the covered position. The stowage compartment is located within vehicle 3.

Cover assembly 1 includes a middle section 4 and two cover sections 5. In the covered position, cover sections 5 are laterally disposed on respective sides of middle section 4 and are planarly adjacent thereto. In this case, middle section 4 is used as a storage shelf. In the stowed position, cover sections 5 are disposed beneath middle section 4.

Roof 2 includes roof sections 7, 8 which are connected together to move between the covered and stowed positions. Roof 2 includes movable C-pillars 6. In the stowed position, C-pillars 6 are lowered and stowed together with roof sections 7, 8 in the stowage compartment of vehicle 3. The stowage compartment is partially located beneath cover assembly 1. The lowering of C-pillars 6 exposes a space which may be covered by cover sections 5.

As cover sections 5 are symmetrically disposed with respect to middle section 4, the description below is limited to the left-hand side cover section 5 as viewed in the forward travel direction of vehicle 3.

Figure 3:
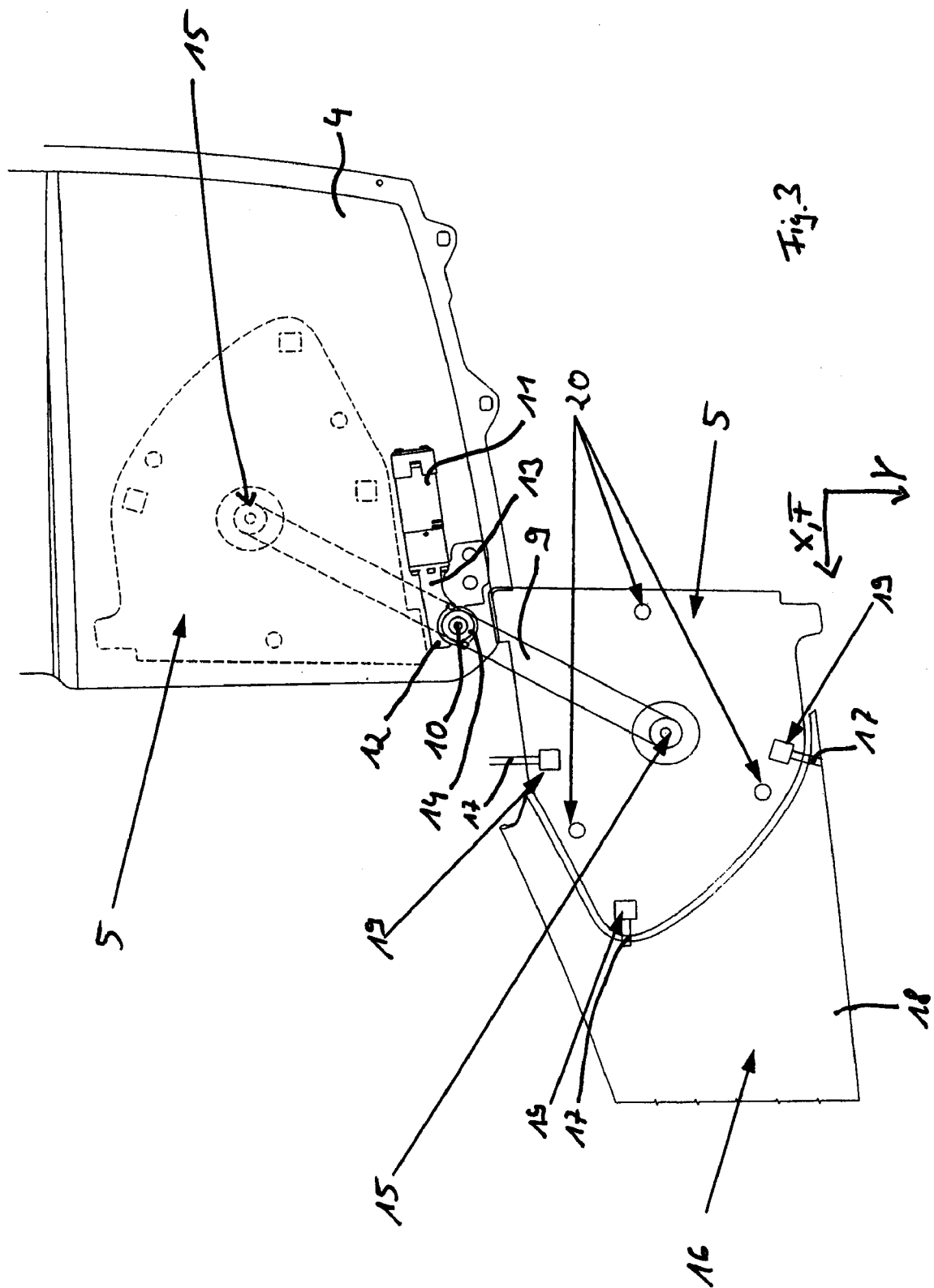
FIG. 3 illustrates a sectional view below the middle section of the cover assembly together with one of the cover sections of the cover assembly pivotably supported on the middle section by a swivel arm.

Referring now to FIG. 3, with continual reference to FIG. 1, a sectional view below middle section 4 together with left-hand side cover section 5 is shown. Cover section 5 is illustrated in the covered position in the lower portion of FIG. 3. Cover section 5 is illustrated in the stowed position by the dashed lines in the upper portion of FIG. 3. In the stowed position, cover section 5 is beneath middle section 4 (partially illustrated).

A swivel arm 9 pivotably connects planar cover section 5 to middle section 4. Swivel axis 10 of swivel arm 9 runs substantially perpendicular to the planar surface of middle section 4. Cover section 5 adjusts (i.e., moves) between the covered and stowage positions upon swivel arm 9 being driven.

An electric motor 11 is used to drive swivel arm 9 in order to move cover section 5 between the covered and stowage positions. Gearing 12 is situated between swivel arm 9 and motor 11. Gearing 12 includes a gearing worm 13 and a worm gear 14 fixedly connected to swivel arm 9. Motor 11 drives gearing worm 13 to rotate worm gear 14 by which cover section 5 supported on swivel arm 9 is adjustable between the covered and stowage positions.

Cover section 5 is supported in a floating manner by a bearing 15 on swivel arm 9. Bearing 15 allows cover section 5 to move along X, Y, and Z coordinate axes relative to swivel arm 9. FIG. 3 illustrates the X-axis and the Y-axis in the plane defined by cover section 5. The X-axis extends substantially in the direction of forward vehicle travel F. The Y-axis extends substantially in the transverse direction of vehicle 3. The Z-axis (not illustrated) extends substantially into the plane of the drawing of FIG. 3, perpendicular to the X-axis and the Y-axis. As such, the Z-axis runs essentially parallel to swivel axis 10 of swivel arm 9.

As shown in the lower portion of FIG. 3, cover section 5 is supported on vehicle body 16 in the covered position. More precisely, cover section 5 rests on a railing 17 on outer skin 18 of vehicle body 16. Railing 17 is set back with respect to outer skin 18 in the direction of the interior of vehicle 3 to ensure flush contact of the top side of cover section 5 with outer skin 18.

A plurality of centering means 19 having stop bevels 24 are situated on the underside of cover section 5 to enable cover section 5 to precisely assume the covered position. By centering means 19 or stop bevels 24, cover section 5 in its displacement to the covered position traverses railing 17, and in interaction with centering means 19 and railing 17 is centered in the covered position of cover section 5.

There are various possibilities by which cover section 5 may swivel into its covered position. For example, swivel arm 9 may swivel cover section 5 into its covered position. It is also possible to move cover section 5 into its covered position from above. That is, cover section 5 may be moved in the negative Z-axis direction into its covered position. This may be achieved by a swivel motion of middle section 4 about a swivel axis extending in the transverse direction of vehicle 3.

Swivel arm 9 swivels cover section 5 outward from its stowed position next to middle section 4 in which middle section 4 is essentially vertical or diagonally inclined. Middle section 4 is then swivelled into its essentially horizontal position illustrated in FIG. 3 whereby cover section 5 reaches its covered section from above. Multiple stops 20 which contact vehicle components are on the underside of cover section 5 for adjustment of cover section 5 along the Z-axis and relative to swivel arm 9.

Figure 2:
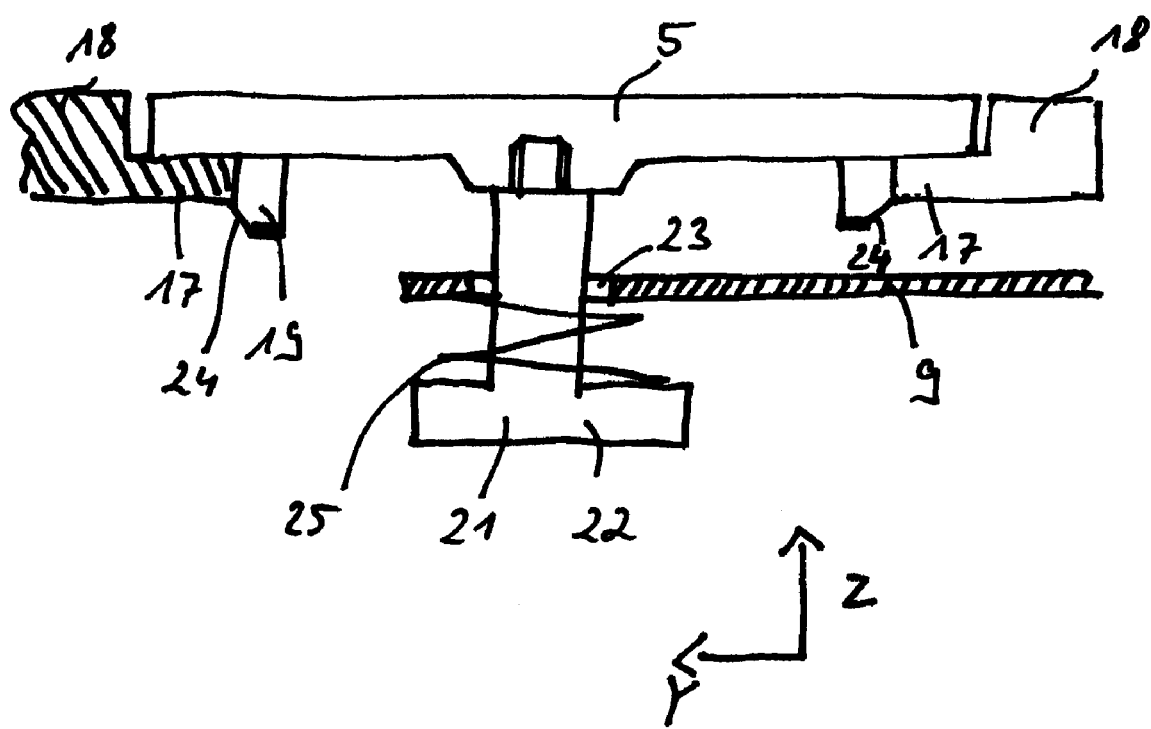
FIG. 2 illustrates a cross-sectional view of one of the cover sections of the cover assembly in which the cover section is supported in a floating manner in the covered position.

Referring now to FIG. 2, with continual reference to FIGS. 1 and 3, a cross-sectional view of cover section 5 in which cover section 5 is supported in a floating manner in the covered position is shown. The Y-axis and the X-axis (not illustrated) once again lie in the imaginary plane defined by cover section 5 or the average planar surface of cover section 5. The Z-axis runs perpendicular thereto essentially in the vertical direction in the stored position. A bolt 21 having a bolt head 22 is screwed to the underside of cover section 5. Bolt 21 is guided with radial play (i.e., in the X-axis and Y-axis directions in this case) through a receiving opening 23 within swivel arm 9. The resulting clearance is approximately +/−5 mm along the X-axis and the Y-axis. In addition to being radially displaceable, bolt 21 is also axially displaceable within receiving opening 23. This results in adjustability of bolt 21, and thus of cover section 5, along all three coordinate X, Y, Z axes relative to swivel arm 9.

In the covered position, cover section 5 is located to the side of middle section 4. Cover section 5 rests with its underside on railing 17 on outer skin 18 of vehicle body 16. Cover section 5 is centered within the opening to be covered by centering means 19 together with their stop bevels 24 which slope upward in the direction of railing 17.

A coil spring 25 is situated between swivel arm 9 and bolt head 22. Spring 25 is supported at one end on bolt head 22 and at the other end on swivel arm 9. Spring 25 pulls cover section 5 in the direction of swivel arm 9 and thus in the direction of railing 17, thereby stabilizing cover section 5 in its covered position. For example, when cover section 5 together with swivel arm 9 is swivelled from above into the covered position and centering means 19 with their stop bevels 24 traverse railing 17, cover section 5 is pulled and tensioned by spring 25 into the covered position. Cover section 5 thus performs a relative motion with respect to swivel arm 9. Accordingly, a precise adjustment of cover section 5 to swivel arm 9 or of swivel arm 9 to middle section 4 or to some other linkage point may be omitted during installation. Centering is performed automatically by cover assembly 1.

In addition to the lateral swiveling of cover section 5 into its covered position and/or the swiveling of cover section 5 in the negative Z-axis direction into its covered position, the motion may be performed from below. Spring 25 is then advantageously situated in such a way that cover section 5 is pushed away from swivel arm 9 in the direction of vehicle body 16.

| | List of Reference Numerals | |
|---|---|---|
| 1 | Cover assembly | |
| 2 | Vehicle roof | |
| 3 | Vehicle | |
| 4 | Middle section | |
| 5 | Cover sections | |
| 6 | C-pillars | |
| 7 | Roof section | |
| 8 | Roof section | |
| 9 | Swivel arm | |
| 10 | Swivel axis | |
| 11 | Electric motor | |
| 12 | Gearing | |
| 13 | Gearing worm | |
| 14 | Worm gear | |
| 15 | Bearing | |
| 16 | Vehicle body | |
| 17 | Railing | |
| 18 | Outer skin | |
| 19 | Centering means | |
| 20 | Stops | |
| 21 | Bolt | |
| 22 | Bolt head | |
| 23 | Receiving opening | |
| 24 | Stop bevels | |
| 25 | Coil spring | |
| F | Direction of forward vehicle travel | |

While embodiments of the present invention have been illustrated and described, it is not intended that these embodiments illustrate and describe all possible forms of the present invention. Rather, the words used in the specification are words of description rather than limitation, and it is understood that various changes may be made without departing from the spirit and scope of the present invention.

What is claimed is:

1. A cover assembly for the stowage compartment of a roof of a vehicle, wherein the roof is movable between a covered position in which the roof covers the interior of the vehicle and a stowage position in which the roof is lowered into the stowage compartment thereby exposing the vehicle interior, the cover assembly comprising:
    a middle section;
    a cover section;
    a swivel arm having first and second ends, the first end of the swivel arm being connected to the middle section and being disconnected from the cover section, the second end of the swivel arm being connected to the cover section and being disconnected from the middle section, the first end of the swivel arm being rotatable relative to the middle section about a swivel axis extending along a Z-axis perpendicular to a plane defined by X and Y axes such that the cover section is movable upon movement of the swivel arm relative to the middle section between the covered position in which the cover section is laterally disposed to a side of the middle section with the middle section and the cover section substantially lying in the plane and the stowage position in which the cover section is disposed beneath the middle section along the Z-axis and lies substantially parallel with the middle section, wherein in the covered position the cover section is supportable on the body of the vehicle; and
    a floating bearing supporting the cover section on the second end of the swivel arm connected to the cover section such that the cover section is adjustable along the X, Y, and Z axes relative to the swivel arm, wherein the cover section is simultaneously adjustable in the plane and along the Z-axis.

2. The cover assembly of claim 1 wherein:
    in the covered position the cover section is supportable on a railing on the vehicle body.

3. The cover assembly of claim 1 further comprising:
    a motor having gearing for swiveling the swivel arm relative to the middle section to move the cover section between the covered position and the stowage position, wherein the gearing includes a worm gear and a gearing worm, wherein the worm gear is connected to the swivel arm in a rotationally fixed manner and the gearing worm is driven by the motor to swivel the swivel arm relative to the middle section.

4. The cover assembly of claim 1 further comprising:
    a plurality of centering means on the vehicle body for centering the cover section in the covered position.

5. The cover assembly of claim 4 wherein:
    each centering means includes a stop bevel.

6. The cover assembly of claim 1 further comprising:
    a plurality of centering means on the cover section for centering the cover section in the covered position.

7. The cover assembly of claim 6 wherein:
    each centering means includes a stop bevel.

8. The cover assembly of claim 1 wherein the floating bearing comprises:
    a bolt having first and second ends, the bolt extending along the Z-axis from a first side of the swivel arm through a receiving opening of the swivel arm to a second side of the swivel arm and the first end of the bolt is mounted to the cover section, wherein the bolt is guided with axial displacement along the Z-axis and radial play along the X-axis and the Y-axis through the receiving opening in the swivel arm and is mounted on the swivel arm.

9. The cover assembly of claim 8 wherein:
    the second end of the bolt includes a bolt head facing the first side of the swivel arm;
    the floating bearing further comprising a spring between the bolt head and the first side of the swivel arm, wherein the spring is supported at one end on the bolt head and is supported at the other end on the swivel arm.

10. The cover assembly of claim 9 wherein:
    the cover section is adjustable relative to the swivel arm in a direction parallel to the Z-axis away from the swivel arm against the force of the spring.

11. A cover assembly for the stowage compartment of a roof of a vehicle, wherein the roof is movable between a covered position in which the roof covers the interior of the vehicle and a stowage position in which the roof is lowered into the stowage compartment thereby exposing the vehicle interior, the cover assembly comprising:

a middle section and first and second cover sections;

a first swivel arm having first and second ends, the first end of the first swivel arm being connected to the middle section and being disconnected from the first cover section, the second end of the first swivel arm being connected to the first cover section and being disconnected from the middle section, the first end of the first swivel arm being rotatable relative to the middle section about a swivel axis extending along a Z-axis perpendicular to a plane defined by X and Y axes such that the first cover section is movable upon movement of the first swivel arm relative to the middle section between the covered position in which the first cover section is laterally disposed to one side of the middle section with the middle section and the first cover section substantially lying in the plane and the stowage position in which the first cover section is disposed beneath the middle section along the Z-axis, wherein in the covered position the first cover section is supportable on a first part of the body of the vehicle;

a first floating bearing supporting the first cover section on the second end of the first swivel arm connected to the first cover section such that the first cover section is adjustable along X, Y, and Z axes relative to the first swivel arm, wherein the first cover section is simultaneously adjustable in the plane and along the Z-axis;

a second swivel arm having first and second ends, the first end of the second swivel arm being connected to the middle section and being disconnected from the second cover section, the second end of the second swivel arm being connected to the second cover section and being disconnected from the middle section, the first end of the second swivel arm being rotatable relative to the middle section about a swivel axis extending along the Z-axis such that the second cover section is movable upon movement of the second swivel arm relative to the middle section between the covered position in which the second cover section is laterally disposed to an opposite side of the middle section with the middle section and the second cover section substantially lying in the plane and the stowage position in which the second cover section is disposed beneath the middle section along the Z-axis and lies substantially parallel with the middle section, wherein in the covered position the second cover section is supportable on a second part of the body of the vehicle; and a second floating bearing supporting the second cover section on the second end of the second swivel arm connected to the second cover section such that the second cover section is adjustable along X, Y, and Z axes relative to the second swivel arm, wherein the second cover section is simultaneously adjustable in the plane and along the Z-axis.

12. The cover assembly of claim 11 wherein:

in the covered position the first cover section is supportable on a first railing on the vehicle body and the second cover section is supportable on a second railing on the vehicle body.

13. The cover assembly of claim 11 wherein:

the first floating bearing includes a first bolt having first and second ends, the first bolt extending along the Z-axis from a first side of the first swivel arm through a receiving opening of the first swivel arm to a second side of the first swivel arm and the first end of the first bolt is mounted to the first cover section, wherein the first bolt is guided with axial displacement along the Z-axis and radial play along the X-axis and the Y-axis through the receiving opening in the first swivel arm and is mounted on the first swivel arm; and the second floating bearing includes a second bolt having first and second ends the second bolt extending along the Z-axis from a first side of the second swivel arm through a receiving opening of the second swivel arm to a second side of the second swivel arm and the first end of the second bolt is mounted to the second cover section, wherein the second bolt is guided with axial displacement along the Z-axis and radial play along the X-axis and the Y-axis through the receiving opening in the second swivel arm and is mounted on the second swivel arm.

14. The cover assembly of claim 13 wherein:

the second end of the first bolt includes a first bolt head facing the first side of the first swivel arm, and the second end of the second bolt includes a second bolt head facing the first side of the second swivel arm;

the first floating bearing further comprising a first spring between the first bolt head and the first side of the first swivel arm, and the second floating bearing further comprising a second spring between the second bolt head and the first side of the second swivel arm, wherein the first spring is supported at one end on the first bolt head and is supported at the other end on the first swivel arm and the second spring is supported at one end on the second bolt head and is supported at the other end on the second swivel arm.

15. The cover assembly of claim 14 wherein:

the first cover section is adjustable relative to the first swivel arm in a direction parallel to the Z-axis away from the first swivel arm against the force of the first spring, and the second cover section is adjustable relative to the second swivel arm in a direction parallel to the Z-axis away from the second swivel arm against the force of the second spring.

* * * * *